United States Patent [19]
Griffith

[11] 3,760,489
[45] Sept. 25, 1973

[54] TOOL STORAGE AND IDENTIFICATION SYSTEM

[75] Inventor: Edward G. Griffith, West Allis, Wis.

[73] Assignee: Kearney & Trecker Corporation, West Allis, Wis.

[22] Filed: Apr. 29, 1971

[21] Appl. No.: 138,668

Related U.S. Application Data

[62] Division of Ser. No. 797,812, Feb. 10, 1969.

[52] U.S. Cl. .................................. 29/568, 211/1.5
[51] Int. Cl. ............................................. B23q 3/157
[58] Field of Search ........................... 29/568, 26 A; 211/1.5

[56] References Cited
UNITED STATES PATENTS

| | | | |
|---|---|---|---|
| 3,477,121 | 11/1969 | Martin | 29/568 |
| 3,277,568 | 10/1966 | Wetzel | 29/568 |
| 3,300,856 | 1/1967 | Daugherty | 29/568 |
| 3,143,900 | 8/1964 | Oeckl et al. | 408/226 |
| 1,281,629 | 10/1918 | Monahan | 408/124 X |
| 3,218,706 | 11/1965 | Zankl et al. | 29/568 |
| 3,161,951 | 12/1964 | Anthony | 29/568 |
| 3,545,075 | 12/1970 | Ollearo | 29/568 |

Primary Examiner—Andrew R. Juhasz
Assistant Examiner—Z. R. Bilinsky
Attorney—Cyril M. Hajewski and Donald E. Porter

[57] ABSTRACT

This invention relates to tool storage and identifying means including an improved storage magazine journalled to rotate about a horizontal support axis and provided with radially disposed tool sockets adapted to receive an intermixed combination of rearwardly coded tools. Power actuated means are provided to releasably urge latches in one direction to prevent accidental withdrawal of a tool from its socket, and to retain each rearwardly coded tool releasably latched in a code identifying position relative to a resiliently operable switch identifier carried by the magazine support. After identification of a tool, power actuated means retract a particular latch for releasing and transferring the selected tool to the tool operator.

5 Claims, 10 Drawing Figures

INVENTOR
EDWARD G. GRIFFITH
William C. Gleisner Jr.
ATTORNEY

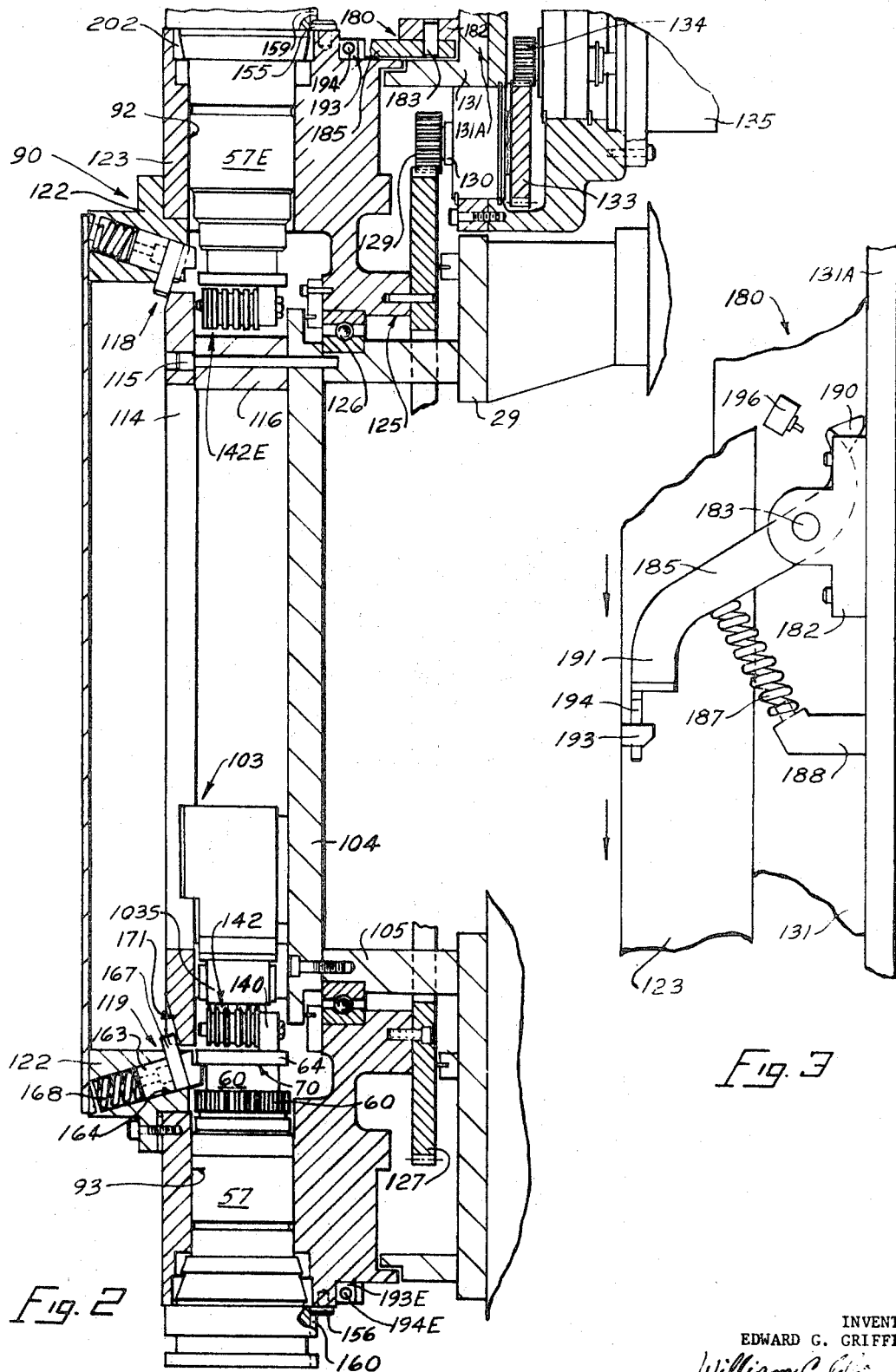

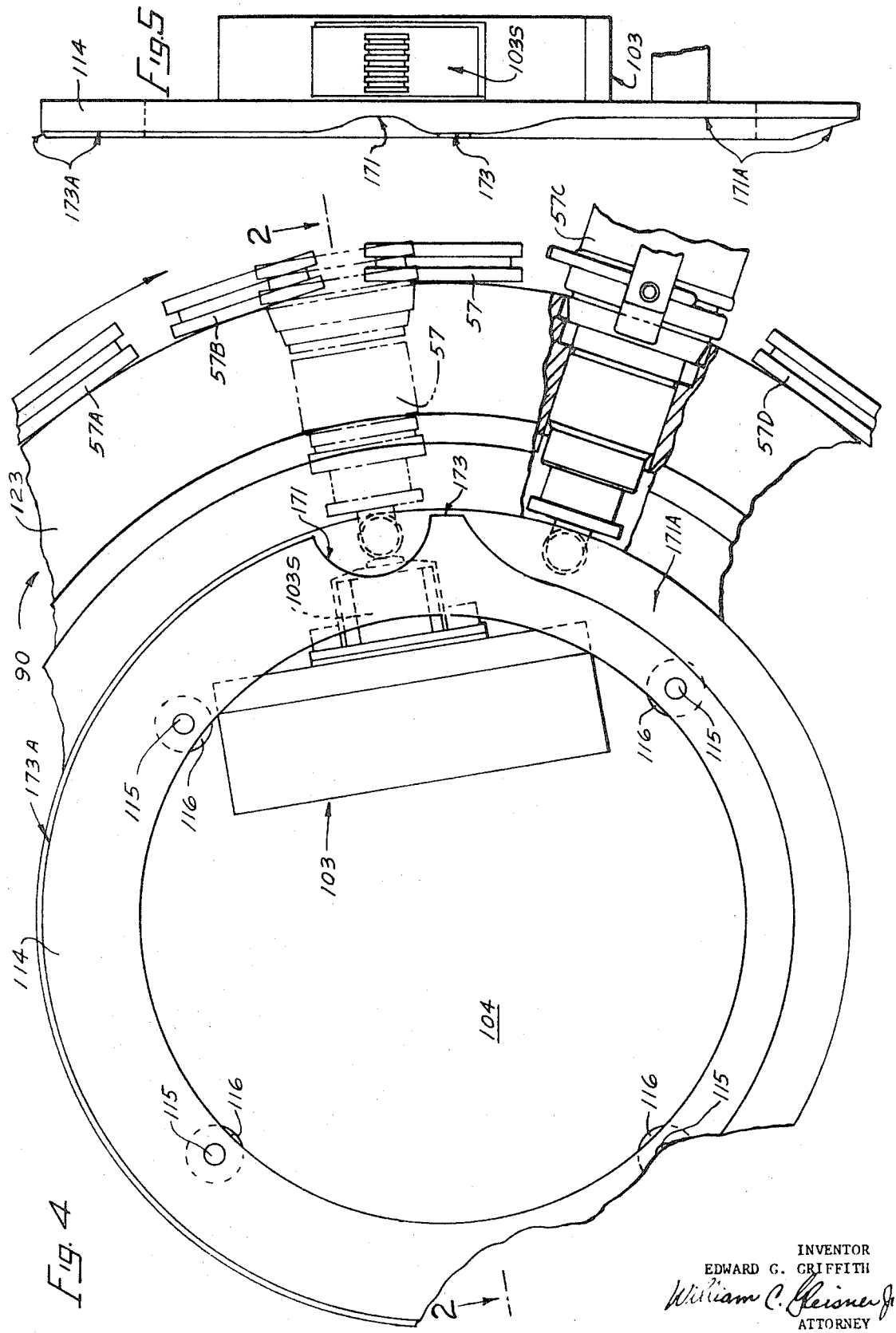

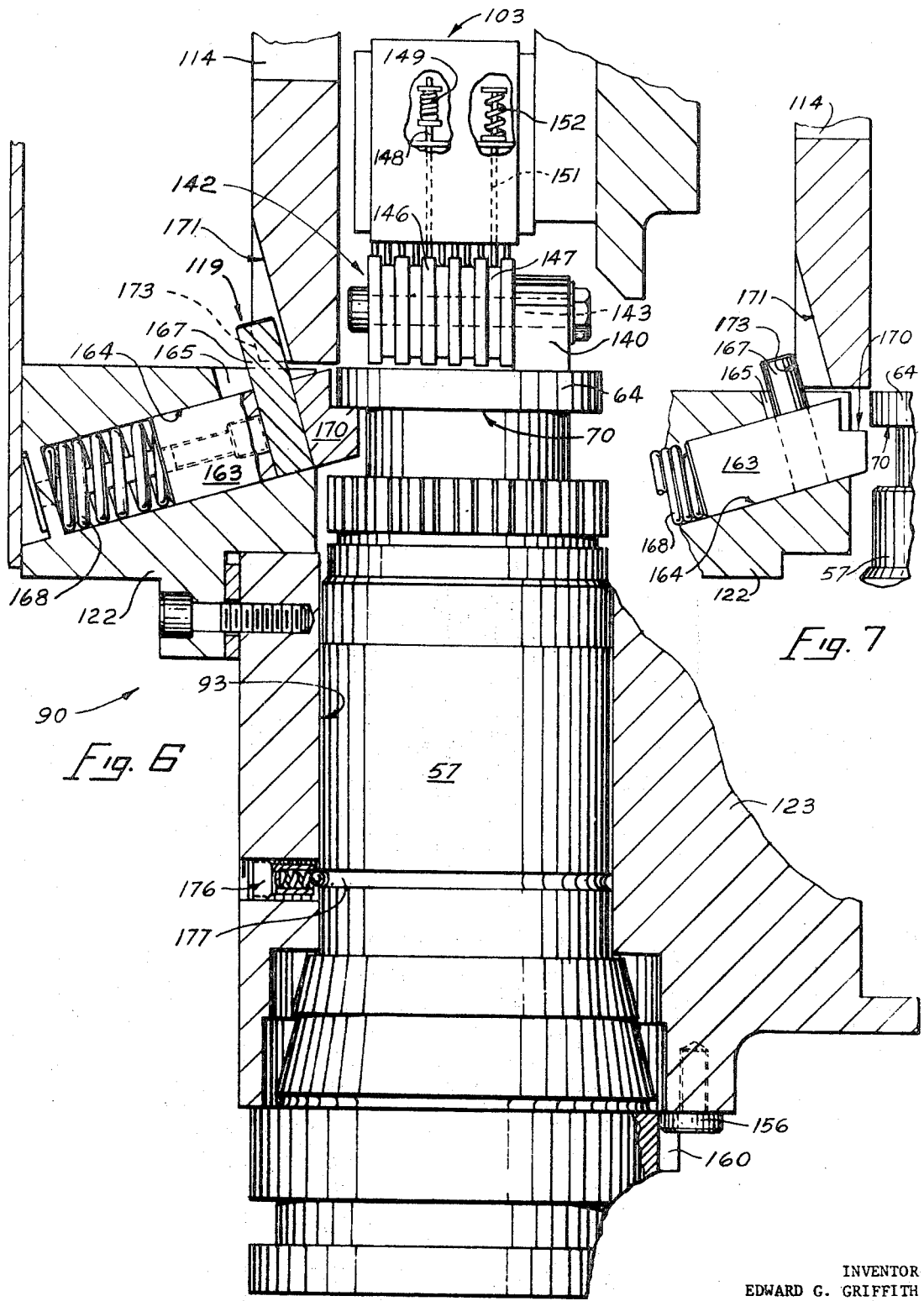

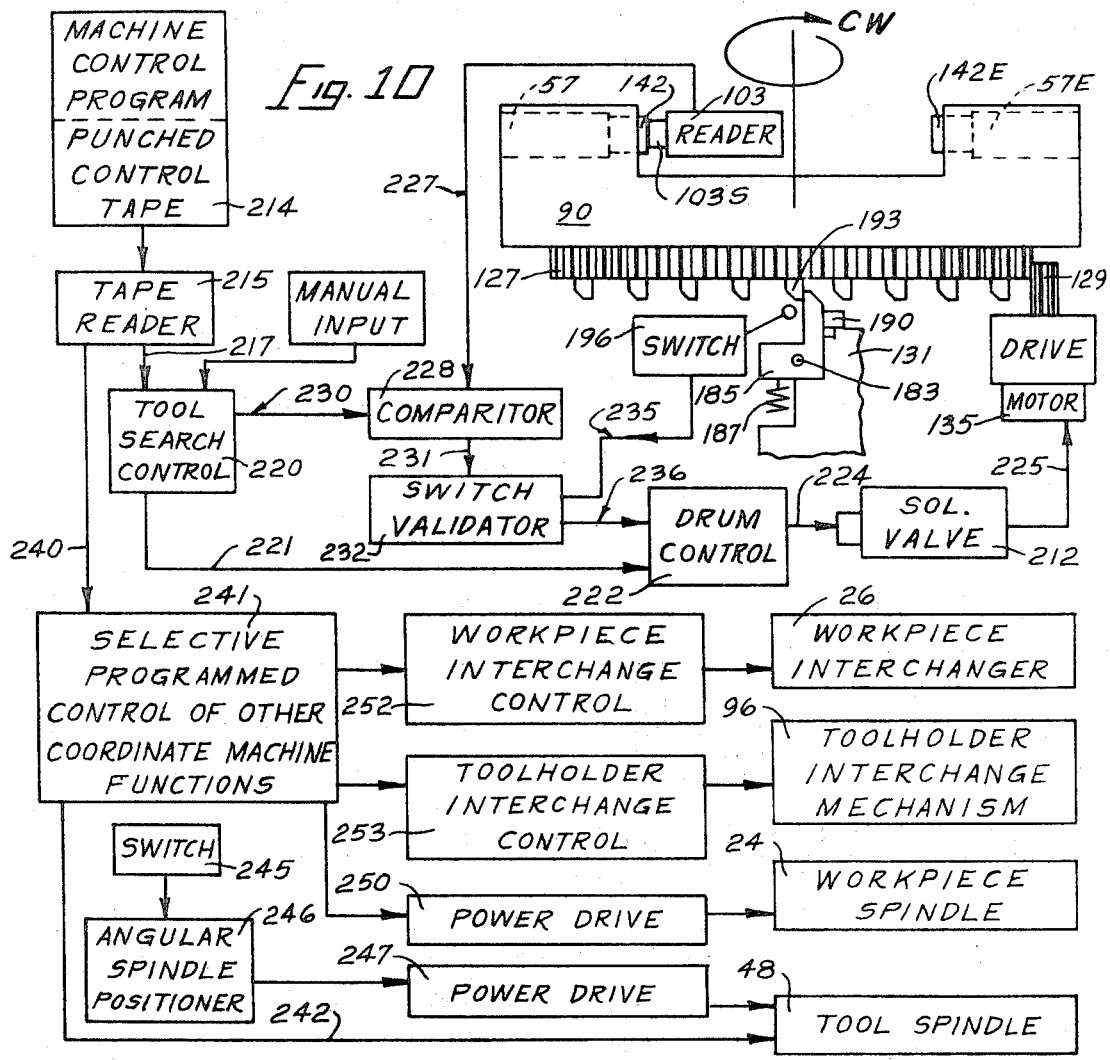
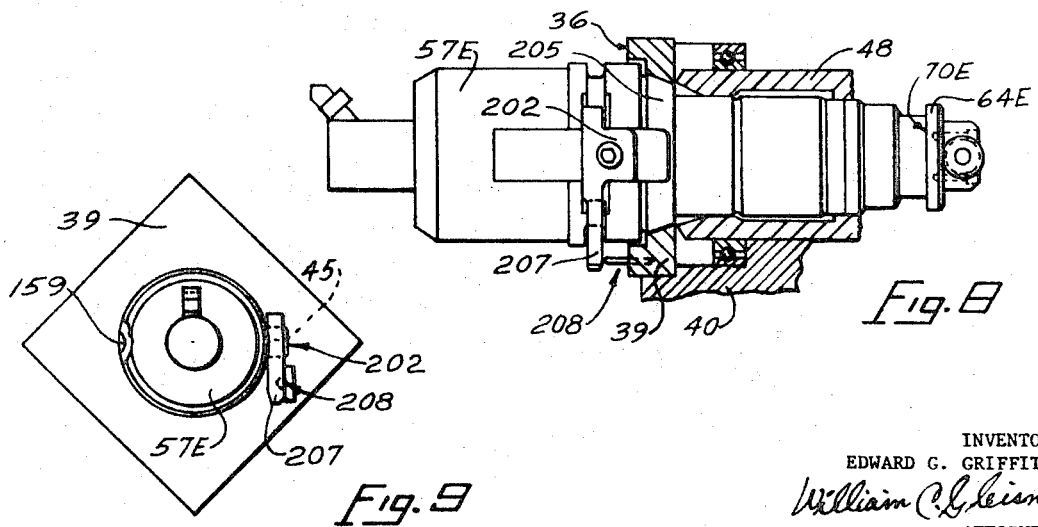

TOOL STORAGE AND IDENTIFICATION SYSTEM

This patent application is a division of application, Ser. No. 797,812, filed Feb. 10, 1969 for a "TOOL SELECTOR WITH MAGAZINE." The present invention relates to a tool storage magazine particularly adapted to receive tools code identified at their inner rearward ends for coded actuation and identification of a spaced apart code actuated switch identifier.

BACKGROUND OF THE INVENTION

This invention relates generally to a machining center having differently coded tools carried by an associated tool storage magazine for identification by a command program, and individual transfer movement to the tool operator by a movable tool changer. Each stored tool presented coded identifying means at its forward end to actuate a stationary coded switch identifier to position a preselected tool at a tool interchange position; and a grip engageable by a power driven tool changer operative to interchange a tool in the tool operator with a selected tool from the magazine. Spring actuated ball type detents provided around the periphery of the magazine sockets engaged peripheral grooves in the tools with sufficient pressure both to retain the coded tool in proper stored position and to actuate the switch means.

SUMMARY OF THE INVENTION

According to this invention, there is provided a tool operator adapted to individually receive either rotary or non-rotary cutting tools, both types being coded at their non-cutting inner, rearward ends to simplify coded tool identification. The tool operator comprises a power driven rotatable tool spindle journalled to rotate concentrically with a stationary driving faceplate fixedly secured to the machine column. A common, axially movable draw-in-rod mechanism is carried concentrically and rotatably within the rearward end of the rotatable tool spindle, and in alignment with a circular drive opening in the faceplate.

Both the fixed and rotating tools are provided with flanged rearward ends adapted to be engaged by the common draw-in-rod mechanism for retention in the tool operator. For identifying a selected tool, a tool magazine journalled in the machine frame about a horizontal axis is provided with radially disposed tool sockets open at their rearward ends relative to a fixed coded switch identifier. Transverse latches in the magazine are movable relative to the separate sockets for releasable engagement with the flanged end of a particular tool slidably inserted in the associated socket. Each latch engages a rearwardly coded tool both during indexing and during binary identification by the single switch reader. Means are provided to retract a latch from a preselected tool upon its arrival in a tool interchange station relative to the tool operator, and for loading tools.

BRIEF DESCRIPTION OF THE DRAWINGS

FIG. 2 is a fragmentary enlarged view in vertical section through the tool storage magazine;

FIG. 3 is a fragmentary enlarged view, partly in section, through the stop mechanism for locating a selected tool;

FIG. 4 is an enlarged view of the tool storage magazine;

FIG. 5 is an enlarged fragmentary view in elevation through the control cam and binary coded tool identifying reader;

FIG. 6 is a fragmentary view, partly in section, through a single storage socket, tool latch, and stored tool;

FIG. 7 is a view showing the tool latch disengaged;

FIG. 8 is a view in elevation of a non-rotating toolholder with a fragmentary sectional view of a tool operator 36;

FIG. 9 is a front view of the spindle drive faceplate; and

FIG. 10 is a diagrammatic block diagram of a control circuit for controlling the tool identification system.

DESCRIPTION OF THE PREFERRED EMBODIMENTS

Figure 1:
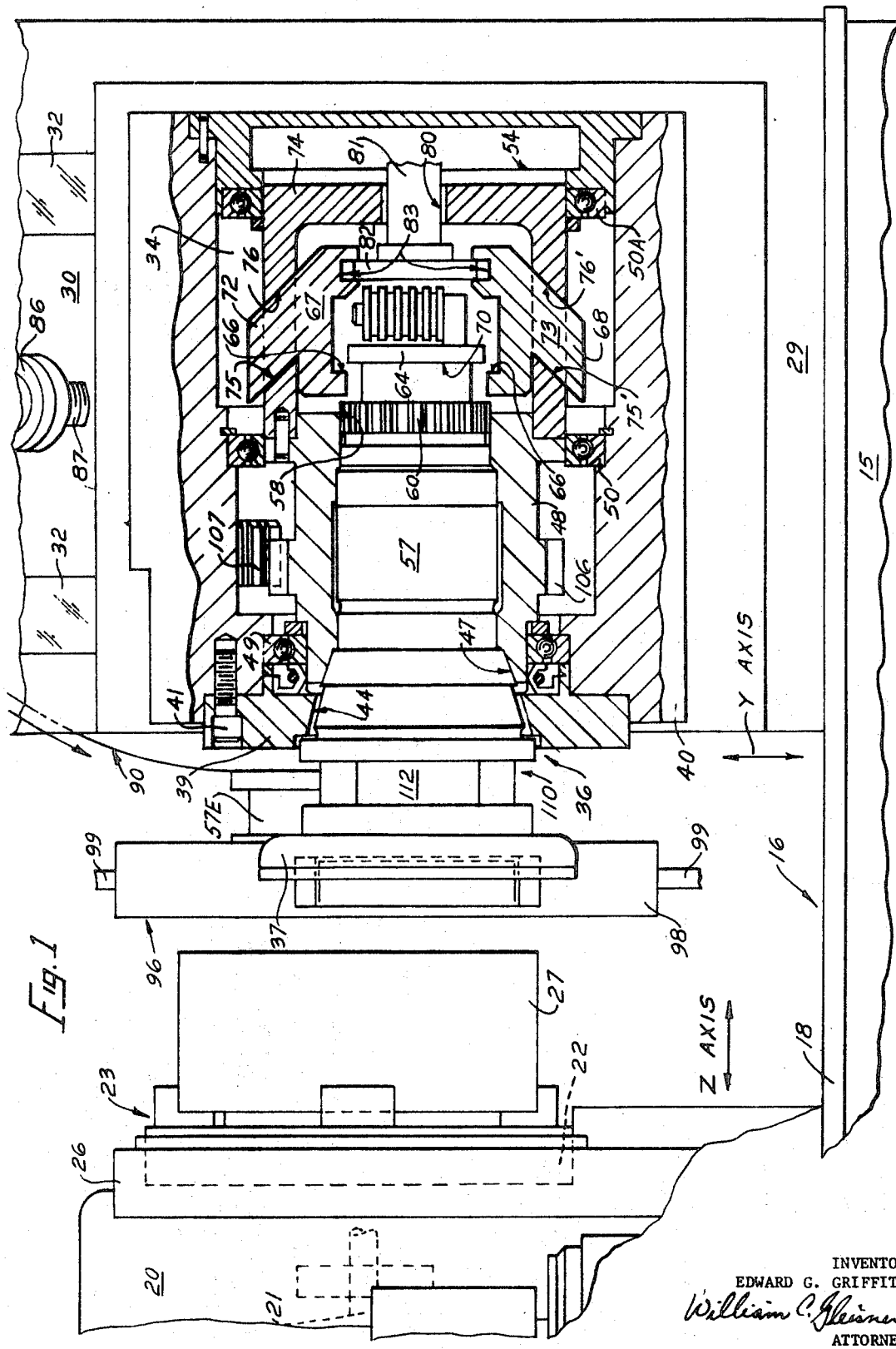
FIG. 1 is a fragmentary view of a machine tool incorporating invention and taken partly in front elevation and partly in vertical section.

Referring to the drawings and specifically to FIG. 1 thereof, a machine tool incorporating the features of the present invention is shown in fragmentary form as comprising a base 15 provided on its upper face 16 with the usual spaced apart horizontal guideways, only one guideway 18 being shown. Complementary guideways (not shown) presented by the underside of a work supporting headstock 20 engage the horizontal bed guideways 18. A work supporting spindle 21 is journalled in the headstock 20 and is connected to a power source (not shown) for selective rotation.

As shown in FIG. 1, the spindle 21 is connected to drive an adapter ring 22 carrying a plurality of radially movable clamp jaws indicated generally at 23 for clamping a workpiece 27. For effecting turning or drilling operations, a power translating mechanism (not shown) is connected to effect selective horizontal movement of the headstock along the Z axis. A bodily movable work changer 26 is operative to interchange the workpiece 27 with another workpiece (not shown).

At one end of machine base 15, there is provided an upstanding column 29 having an angularly inclined side face 30. Parallel ways 32 are secured to column face 30 for slidably supporting a cross-slide housing 34 for angularly guided, vertical movement. A tool operator 36 carried by cross-slide 34 is disposed to move a tool, such as the face-mill 37, relative to a workpiece 27.

To perform different machining operations including boring or milling, the tool operator 36 is adapted to support a fixed, non-rotating tool or a rotatable tool relative to concentric axes. To do this, tool operator 36 comprises a stationary, non-rotating driving faceplate 39 fixedly secured to the front face 40 of the cross-slide housing 34 by spaced screws, such as capscrew 41. A bored, tapered opening 44 with a key-way 45 is provided in the stationary tool driving faceplate 39, FIGS. 1 and 9. The angular bored openings 44 with faceplate 39 is concentric with an axially aligned, similar tapered opening 47 formed in the forward end of a concentric rotatable tool spindle 48 journalled in cross-slide 34 by bearings 49 and 50.

Draw-in-rod mechanism 54 is secured to the rearward end of the tool spindle 48 for selective axial tool clamping movement. Clamping mechanism 54 is movable to urge a rotatable toolholder, such as the toolholder 57, into inward splined driven engagement with drive splines 58 presented by the rotatable spindle 48; spindle splines 58 are then engaged by complementary toolholder splines 60. Upon axial removal of rotatable toolholder 57 from splined engagement with the spindle 48, the identical draw-in-rod mechanism 54 is movable to urge a non-rotating fixed tool, such as toolholder 57E in FIGS. 2 and 8 into keyed engagement with the stationary faceplate 39. The rotatable power drive to the tool spindle is then deenergized, and its inner end simply supports the non-rotating toolholder 57E in fixed concentric relationship to stationary faceplate 39. Spindle 48 cooperates with the faceplate 39 to constitute a stationary, fixed support for the stationary fixed tools such as the boring toolholder 57E.

Tool operator 36 provides dual functions for releasably supporting either a fixed tool or a rotatable tool relative to the common axis.

For securing either a non-rotary or a rotary tool to the tool operator 36, both types of toolholders are provided with a clamping flange toward their inner ends, for example flange 64 on toolholder 57. Gripping surfaces 66 respectively presented by clamp arms 67 and 68 are movable inwardly and axially rearward into clamped engagement with a surface 70 presented by toolholder flange 64. Clamp arms 67 and 68 are integrally formed with angularly and radially extending guides 72 and 73. A cylindrical hollow cap 74 is secured to the rearward end of the spindle 48 and journalled in rear bearing 50A. Cap 74 is provided with angularly diverging guideways formed by one pair of parallel ways 75 and 76 engaging angular clamp guide 72, and another pair of parallel ways 75' and 76' engaging angular clamp guide 73.

Cap 74 is provided with a circular bore 80 disposed to guide an axially movable actuating rod 81. A circular flange 82 secured to the inner end of the actuating rod 81 slidably engages like formed, transverse slots 83 formed in the rearward, inner portions of the clamp guides 72 and 73. A power source (not shown) is connected to effect rearward movement of the actuating rod 81 and circular flange 82 secured thereto. Rearward movement of circular flange 82 slidably engages the inward slots 83 in the clamp arm guides 72 and 73 to urge the clamp arms 67 and 68 axially inward and rearward. Gripping surfaces 66 presented by the respective arms are moved from the release positions, FIG. 1, into converging clamped engagement with surface 70 presented by the toolholder flange 64.

For effecting selective movement of a tool carried by the operator 36 relative to a workpiece, a screw and nut translator connected between cloumn 30 and crossslide 34 includes a motor 86 connected to rotate a translating screw 87 that engages a nut (not shown).

To store fixed and rotatable tools for interchange with a tool carried by tool operator 36, storage magazine 90 is rotatably carried by the column 30, as indicated in FIGS. 1 and 2. Magazine 90 is provided with a plurality of radially extending tool receiving sockets having inwardly open ends, such as sockets 92 and 93. A plurality of storage sockets are formed in the storage magazine 90 which is selectively indexable to position a preselected tool in a tool interchange position. As indicated in FIG. 1, storage magazine 90 has been indexed to position a toolholder 57E in the horizontal tool change position, in spaced apart parallelism to the spindle 48. To effect a tool change, cross-slide 34 is moved to position the tool operator 36 in a preset, offset parallel position relative to toolholder 57E. Next, a power actuated tool change mechanism 96 movably carried by the column 30 is operated to effect a tool interchange between the tool storage magazine 90 and the tool operator 36. To do this, tool change mechanism 96 is provided with a transfer arm 98 carried for axial and rotatable movement relative to column 30. Transfer arm 98 is provided with a pair of oppositely extending tool grips 99 that are simultaneously extensible into gripping engagement with toolholders respectively carried by magazine 90 and tool operator 36. With both grips 99 engaging tools in the magazine 90 and the tool operator 36, arm 98 is moved outward to withdraw the next selected tool from the magazine and the used tool from the tool operator. The arm 98 is then rotated 180° to interchange the position of the grips 99, and urged inwardly to reinsert the now interchanged tools.

Stored tools are each retained in predetermined angular positions in the respective storage sockets of the magazine 90 to position coded tool identifiers transversely secured to the inner rearward end of each stored tool in predetermined angular relationship to a binary coded switch mechanism 103, carrying coded switches 103S, and fixedly secured to a circular support plate 104 affixed to the column. The stored tools are maintained in like angular positions during transfer movement between storage magazine 90 and tool operator 36. In preparation for a tool interchange, the rotatable tool spindle 48 presented by the tool operator 36 is rotated into predetermined angular position about its axis by rotary angular positioning means (not shown).

As shown in FIG. 1, spindle 48 is provided with an integral gear 106 operatively engaged by a rotatable drive gear 107 driven by a power source (not shown) for rotating the tool spindle 48. Angular positioning of the tool spindle 48 effects proper positioning of the spindle drive splines 58 for engaging splines presented by the next rotatable toolholder.

To effect a tool interchange, spindle 48 is rotated into predetermined angular relationship to a stored tool 57E positioned at the tool change station. A non-rotary tool such as a boring bar, is inserted and non-rotatably keyed directly to the stationary faceplate 39, and does not require additional angular position.

For maintaining either a rotary or fixed tool in proper angular position during an interchange, both types of toolholders are provided with flanged forward ends having a plurality of flat surfaces, such as the flat surface 112 in FIG. 1. During a tool transfer movement, one tool change arm 99 is power actuated into tight gripping engagement with the toolholder flange 110 and flat 112 presented thereby to constrain the toolholder 57 against both axial and angular movement.

As shown in FIGS. 2 and 3, a circular control cam 114 is secured to the stationary support plate 104 by capscrews 115 and tubular spacers 116. During selective indexing movement of the storage magazine 90, control cam 114 actuates latches 118 and 119 respectively associated with the tool sockets 92 and 93. Each of the tool carrying sockets in magazine 90 is provided with an associated latch movably carried by the magazine for slidable movement relative to cam 114.

Since all tool latches function in identical manner, it is deemed necessary only to describe the operation of those illustrated in FIGS. 2, 6 and 7. The magazine 90 comprises essentially an enlarged outer, circular hub 122 fixedly secured to the enlarged circular magazine member 123 of stepped diameter. To support the magazine 90 for rotation, the circular member 123 thereof is provided with an inner hub 125 of reduced diameter directly engaging the outer race of a bearing 126. The stationary circular spacer support 105 fixedly interconnected between the support plate 104 and column 29 engages the inner race of the bearing 126.

Ring gear 127 is secured to the magazine hub 125 and driven by by a pinion 129 affixed to a shaft 130 journalled in a member 131 secured to column 29. A gear 133 secured to the opposite end of shaft 130 is driven by a gear 134 connected to be driven by reversible motor 135. It is assumed magazine 90 is rotated in one direction to effect random tool selection. Motor 135 is energized to rotate ring gear 127 and tool magazine 90 in a clockwise direction. Magazine 90 is illustrated in only fragmentary form in FIG. 1 from the front of the machine. For uniformity, however, magazine 90 is illustrated in FIG. 4 as being indexable in a clockwise direction when viewed from the rear of the machine. To show toolholder 57 in identifying position as moving in a clockwise direction, FIG. 2 is taken along a slight angular, generally horizontal plane taken along the section 2—2 in FIG. 4.

A more complete description of tool identifying switch mechanism per se and tool interchange mechanism for effecting a similar tool interchange is included in U.S. Pat. No. 3,052,011 to W. E. Brainard et al.

Each of the tools 57 is identified by a number and they are each coded in accordance with the binary system. To this end, the axial inner end of each toolholder 57 is provided with a rearwardly extending bracket 140 carrying a transversely extending binary coded identifier 142. Bracket 140 is provided with a transverse rod or shaft 143 to which are releasably secured a plurality of individual circular code elements. Although eleven (11) separate elements are shown, only two are identified by reference numerals. As shown in FIG. 6, one large diameter code element 146 and one small diameter code element 147 are identified. The large code element 146 is in proper transverse and radial alignment to urge switch actuating rod 148 upwardly to compress the associated resilient spring 149 and close that particular switch contact bar. The other illustrated binary coded switch actuating rod 151 of the reader 103 is resiliently urged to open position by its actuating spring 152 since the extending end of rod 151 is aligned with the small code element 147. Similar individual switches and cooperating springs are associated with the other switch actuating rods depending from the binary operable tool reader 103 and aligned with each of the code elements carried by the tool identifier 142. Total spring pressure exerted by the switch mechanism tool identifier 103 is increased in direct proportion to the large diameter code elements carried by a toolholder being identified.

To insure accuracy of tool identification, stationary control cam 114 controls movement of the latch 119 into full latched position as the particular toolholder 57 shown in FIG. 2 is rotated into axial alignment with the tool reader 103. Thus, each tool is properly maintained in its inner reading position as its binary coded identifier engages the actuating switch plungers.

To maintain the coded identifier 142 in proper angular alignment relative to the switch identifier 103, each toolholder 57 is maintained in like angular position relative to its supporting magazine socket. As shown in FIG. 2, circular keys 155 and 156 are secured to the circular periphery of the magazine 90 and in adjacent relationship to magazine sockets 92 and 93 in a manner to engage circular keyways 159 and 160 in toolholders 57E and 57. Similar keys (not shown) are respectively secured to the other sockets in magazine 90 in corresponding angular relationship to one another and to the coded switch identifier 103. Each of the toolholders is provided with identically formed circular keyways adapted to engage one of the circular magazine socket keys in a manner to maintain each of the binary coded identifiers, such as 142, in identical angular relationship relative to the reader 103.

As shown in FIGS. 2, 4 and 6, the toolholder is represented as being rotated through a radial position relative to the stationary tool reader identifier 103. Each latch, such as 119, comprises a circular member 163 slidably mounted in an angularly inclined guideway 164 formed in the magazine hub 122, as shown in FIGS. 6 and 7. A transverse guide slot 165 formed in the magazine hub 122 opens into the circular guideway 165 to engage a pin 167 carried by the movable guide member 163. A spring 168 is seated within the outer opening 164 to urge the guide member 163 and transverse pin 167 axially inward relative to the stationary control cam 114. An inner notched end 170 presented by member 163 is urged axially inward into latched engagement with a toolholder clamp flange 64.

With toolholder 57 rotated to the axial reading position relative to identifier 103, latch pin 167 is positioned adjacent an enlarged cam bevel 171 formed on control cam 114. With this condition existing, spring 168 urges the latch member 163 and notched end 170 thereof into clamped engagement with toolholder flange 64. As soon as magazine 90 is rotated to move selected toolholder 57 into tool change position, pin 167 is moved peripherally along control cam 114 to engage a reduced cam bevel 173 presented thereby. With reduced bevel 173 engaging latch pin 167, as shown in FIG. 7, guide member 163 is moved outward to retract the notched end 170 of the latch 119 from engagement with clamp flange 64, compressing actuating spring 168. With this condition existing, toolholder 57 is selectively removable from the magazine socket. Spring 168 is compressed as magazine 90 is rotated to move the pin 167 into engagement with the reduced cam bevel 173, the latter defining the horizontal plane for the tool release or transfer station.

As shown in FIG. 4, the rotatable tool magazine 90 is shown in fragmentary form relative to the tool reader identifier 103 and latch control cam 114. Section 2—2 in FIG. 4 indicates an angular plane intersecting the tool reader 103 and switch mechanism 103S and the radial position of the toolholder 57 represented by the phantom lines as being in tool reading position. Clockwise rotation of the magazine 90 effects movement of the toolholder 57 and coded identifier 142 secured thereto through the phantom line position. Binary coded recognition of the toolholder 57 by the identifier 103 conditions the control circuit to effect subsequent stopping of the magazine 90 and reversal to stopped position with the toolholder 57 represented by the solid lines then in the tool interchange position.

Enlarged cam bevel 171 presented by the stationary cam 104 is positioned to latch tool 57 in a tool reading position. With the selected toolholder 57 advanced to its solid line horizontal position, the associated tool latch is actuated by the reduced cam bevel to a tool release position. In addition to the latch actuating bevels 171 and 173 described, stationary control cam 104 is provided with an enlarged cam bevel 171A and a reduced cam bevel 173A. As indicated in FIG. 5, enlarged cam bevel 171A has a beveled edge identical in taper and function to the enlarged bevel 171, and reduced cam bevel 173A has a beveled edge identical in taper and function to the reduced bevel 171.

As shown in FIG. 4, the upper reduced cam bevel 173A presented by the cam 114, extends over a considerable peripheral distance of the cam. It will be apparent that all latches respectively engaging the upper reduced cam groove 173 are radially actuated to their individual outward tool release positions, such as indicated in FIGS. 2 and 7. As the magazine is rotated relative to the upper half of the control cam 114, therefore, each of the tools carried by the magazine may be manually withdrawn from its storage socket for reloading.

The magazine 90 is rotated to advance the radially disposed tools about the horizontal axis. As this occurs, tool latches (not shown) moving relative to the enlarged cam bevel 171A presented by the lower half of the control cam 114, are resiliently actuated to inner tool latching positions as indicated and described for the enlarged cam 171 in FIGS. 4 and 6. Thus, as the magazine 90 is indexed in clockwise direction below an imaginary horizontal line, all tools in the lower half of the magazine are positively latched in their respective sockets to positively retain different sizes and weights of cutting tools in radial inward and upward position.

Upon rotation of magazine 90, therefore, each toolholder carried thereby is successively moved from a tool release position delineated by reduced cam bevel 173A to a tool latch identifying position at enlarged cam bevel 171. Until a preselected tool is code identified by the switch mechanism 103S, each toolholder is likewise advanced from the enlarged cam bevel position 171, through the reduced cam bevel position 173, enlarged bevel position 171A, and returned to the reduced cam bevel position 173A.

As non-selected tools are indexably advanced through the tool change position, the reduced cam bevel 173 actuates successively associated latches to non-latched position. Whenever the power latches are disengaged, the other portions of the dual latching mechanism including the resilient detents are retained in engagement. For example, plural resilient ball detents similar to the detent 176, are urged into engagement with the circular groove 177 in the toolholder 57.

When the number impressed on the reading head tool identifier 103 by the coding on a particular tool coincides with a programmed tool number impressed in the control system, a signal is transmitted to stop forward or clockwise rotation of the magazine 90. When this occurs, the magazine 90 will have over-run the tool change ready position in a manner that the preselected tool 57 is advanced slightly beyond the horizontal tool change ready station. At this time the motor 135 is reversed for rotating the magazine 90 in a reversed counterclockwise direction at a reduced rate until the selected tool 57 is accurately located at the ready station with motor 135 maintained energized for reverse rotation to precisely and dynamically retain the tool socket in ready position.

A stop mechanism 180 shown in FIGS. 2 and 3 is operative both to initiate reversed rotation of the magazine 90 and to stop reversed rotation for precisely locating the preselected tool at the ready station. A bracket 182 affixed to a flange 131A integrally formed with column member 131 supports a bearing pin 183 that pivotally supports a latch arm 185. A spring 187 supported by a bracket 188 secured to the flange 131A resiliently engages the latch arm 185 for urging it in a counterclockwise direction to move the lower end 190 thereof into engagement with the flange 131A. With the latch 185 resiliently urged to its limit of counterclockwise movement, as shown in FIG. 2, the upper end 191 thereof is moved into the circular path of travel of the magazine stop dogs 193, one of which is shown in FIG. 3. Assume now that stop dog 193 is secured to the circular magazine member 123 in position to engage the stop end 191 of latch arm 185 to effect final positioning movement of toolholder 57.

Each one of a plurality of magazine stop dogs, such as 193, secured in peripherally spaced positions about the circular magazine member 123 is operatively associated with a corresponding one of the peripher-ally spaced magazine sockets to effect accurate positioning. An adjusting screw 194 is adjustably threaded in each of the stop dogs including 193 for engaging the upper head end 191 of pivotal latch arm 185 for retaining the preselected toolholder 57 in proper position.

Stop dog 193E and the adjusting screw 194E are secured to the magazine member 123 in approximate diametrically opposed relationship to the magazine socket 92.

As the magazine is rotated in a clockwise tool selecting direction, successive magazine sockets are rotated in a like direction for moving coded tools relative to the stationary tool identifier 103 as explained, and moving spaced apart stop dogs such as 193 sequentially relative to stop mechanism 180.

Clockwise magazine rotation causes the successive magazine stop dogs 193 to individually and pivotally depress the latch arm 185. Initially, as the magazine rotates, the stop dog 193 engages the rearward portion 191 of the latch arm 185, pivoting it in a counterclockwise direction in opposition to actuating spring 187, and fully depressing it by continued clockwise movement to move the lower end 190 counterclockwise to actuate reverse positioning switch 196.

As explained, magazine socket 93 releasably carries a toolholder 57 for relative movement to the tool identifier 103 in coordinated relationship to movement of the associated stop dog 193. In this example, clockwise movement of toolholder 57 actuates identifier 103 in predetermined timed relationship to the associated dog 193 pivoting the latch arm 185 to actuate magazine reverse switch 196. In this case, identifier switch 103 is actuated to complete a circuit to the control that is coincidental to the circuit completed by the program control system. With coincidence established, a validation circuit is completed to render the switch 196 operative to establish a circuit for operating the motor 135 to reverse rotation of the magazine 123.

Slightly prior to this reversal, the magazine member 123 has rotated in a clockwise direction sufficiently to advance the stop dog adjusting screw 194 beyond the upper end 191 of the latch arm 185. Consequently, the spring 187 pivotally returns the arm 185 to its upright position with its lower end 190 engaging the flange 131A. With these conditions established, and reverse switch 196 subsequently actuated by the coincidentally established validation circuit, stop dog 193 is rotated counterclockwise. Stop dog screw 194 is then dynamically urged into continued engagement with the upper end 191 of the pivotal latch arm 185. At the same time, the associated toolholder 57 is returned to its horizontal tool release position as shown in FIGS. 4 and 7.

In the event a non-selected tool is rotated relative to the tool identifier 103, FIG. 2, downward clockwise rotation of the magazine will continue since neither the coded identifier presented by the non-selected tool nor the magazine reverse switch 196 have any effect on magazine movement in the absence of a verification circuit.

The stationary or non-rotatable toolholder 57E indicated in stored position within magazine storage socket 92 is provided with a circular keyway 159 adapted to engage a circular key 156 presented by the magazine member 123 to constrain it against angular displacement. This arrangement also maintains the binary coded identifier 142E secured to the rearward end of the toolholder 57E in proper angular position to actuate switch mechanism 103S during tool selecting magazine rotation.

In addition to the circular locating keyway 159 in toolholder 57E, the latter is provided with an enlarged drive key 202 as shown in FIGS. 2 and 8. In differentiating between these, the circular keyway 159 cooperates with one of the circular keys 156 presented by the magazine 90, as does circular keyway 160 in a rotatable toolholder, for retaining coded, identifier 142E in proper angular position during automatic tool searching. The key 202 presented by fixed toolholder 57E engages a cooperating keyway 45 formed in the non-rotating spindle drive plate 39 for maintaining the fixed drive. As indicated in fragmentary form in FIGS. 8 and 9, the key 202 presented by toolholder 57E is shown in direct, driving engagement with the driving keyway 45 in the fixed drive plate 39. Likewise, the forward tapered edge 205 of the fixed toolholder 57E directly engages the complementary tapered edge of the faceplate 39. The circular inner end of the toolholder 57E directly engages and is supported by the circular inner portion of the tool spindle 48 which is now constrained against rotation. With insertion of the fixed toolholder 57E into the tool operator 36, a lateral tang 207 extending from the drive key 202 is moved inwardly to actuate a spindle stop switch 208 to preclude energization of the spindle drive motor 129. The spindle drive faceplate 39 does not have a circular drive key, FIG. 9, since the rotary tool 57 is rotatable relative thereto upon insertion into the tool operator 36.

A machine control circuit and cooperating tool selecting storage magazine are schematically illustrated in FIG. 10. As there shown, the tool storage magazine 90 is illustrated as being selectively rotatable in a clockwise direction as hereinbefore explained. The driving ring gear 127 and a plurality of beveled actuating dogs, such as dog 193, are fixedly secured to the magazine 90 as illustrated in side elevation in FIG. 10. As there shown, it is assumed a solenoid valve 212 is being actuated to effect reversed rotation of the motor 135 and drive to effect reversed rotation of the magazine drive gear 129. Power transmitted therefrom urges ring gear 127 in reverse direction to maintain dog 193 in dynamic positioning engagement with the pivotal latch arm 185.

It is assumed the selected control tape with punched machine commands is loaded in the machine and program control 214 activated to transmit a binary coded toolholder signal via a tape reader 215 connected by conduit 217 to impress the signal for toolholder 57 in a search control 220. A forward signal is transmitted via conduit 221 to actuate drum control 222 and supply a forward clockwise signal via conduit 224 to solenoid valve 212. A like forward signal is transmitted by conduit 224 to solenoid valve 212. A like forward signal is transmitted by conduit 225 to energize motor 135 for rotating magazine 90 clockwise to move dog 193 leftwardly to actuate switch 196.

Upon arrival of preselected tool 57 in the identification station, preselected signals along conduit 227 actuate signal comparitor 228, which had received a coincidental initiating search signal from conduit 230 and search control 220. With coincidence now established, an actuating signal is transmitted from comparitor 228 via conduit 231 to activate switch validator 232.

As explained, actuation of switch 196 by pivoting dog 185 completes preselected tool 57 signal via conduit 235 connected via now closed validator 232 to conduit 236; the latter transmits a reverse control signal to actuate drum control 222 to supply a reverse signal along conduit 224 to actuate solenoid valve 212 and supply a reverse signal via conduit 225 to effect final reversed positioning rotation of motor 135.

In addition to effecting positioning control of the storage magazine 90, tape reader 215 is operable to transmit programmed signals along conduit 240 for controlling coordinate functions 241. Thus, signals are available along conduit 242 to selectively drive the tool spindle 48. A separate switch 245 is operable for actuating an angular spindle control 246 to actuate spindle drive 247 for rotating the tool spindle to a predetermined angular position. In a similar manner, the workpiece spindle 24 is selectively driven by a power drive 250 connected to receive command signals from programmed control 241. Likewise, both the workpiece interchanger 26 and toolholder interchanger 96 are connected to be individually and selectively actuated by the respective programmed controls 252 and 253.

Although the illustrative embodiments of the invention have been described in considerable detail for the purpose of fully disclosing a practical operative structure and improved tool storage magazine for a machining center, it is to be understood that the particular machining center and tool storage magazine herein described are intended to be illustrative only and that the various novel characteristics of the invention may be incorporated in other structural forms without departing from the spririt and scope of the invention, as defined in the subjoined claims.

The principles of this invention having now been fully explained in connection with the foregoing description, I hereby claim as my invention:

1. In a machine tool having a frame;
 a tool storage magazine indexably carried by said frame and provided with a plurality of tool carriers, each of which is adapted to releasably receive a tool;
 a plurality of code means mounted on each of said tools for identifying the tools, said plurality of code means being mounted along an axis transverse to the axis of each of said tools positioning means associated with each of said tool carriers;
 tool positioning means on each of said tools adapted to engage the positioning means on said carriers when a tool is received by said carriers, said tool positioning means being angularly located in a predetermined angular position with respect to said plurality of code means so that the latter will always be in the same relative angular position in its cooperating carrier; and a tool reader carried by said frame in a predetermined angular position with respect to the positioning means associated with said carriers so that it is positioned to be actuated by said plurality of code means on the tools in said carriers for identifying each of said tools as they pass by said reader with the movement of said magazine.

2. A machine tool according to claim 1 wherein said positioning means on said tools and carriers are keys and keyways which are meshingly engaged when a tool is inserted into one of said carriers.

3. A machine tool according to claim 1 wherein said plurality of code means includes, a rod supported on the rearward end of said tool and extending transversely of the axis of the tool at a predetermined angle with respect to said tool positioning means; and code elements carried by said rod for actuating said tool reader during the movement of the magazine.

4. A machine tool according to claim 1 including, a tool operator adapted to receive the tools in said magazine and employ them in a work operation on a workpiece;

means for angularly positioning said tool operator upon the completion of a work operation for positioning the tool carried therein for transfer to said magazine;

a tool transfer mechanism arranged to transfer the tools between said magazine and said tool operator; and means on said tool transfer mechanism for retaining the relative angular position of said tools during the transfer operation so that said tool positioning means will engage the positioning means on said carrier when the tool is inserted into said carrier by said tool transfer mechanism.

5. A machine tool according to claim 2 including, a spindle rotatably carried by said frame and adapted to receive the tools in said magazine and rotate them for performing a work operation on a workpiece;

means for stopping said spindle in the same predetermined angular position upon discontinuance of its rotation for positioning the tool carried therein for transfer to said magazine;

a tool transfer mechanism arranged to transfer the tools between said magazine and said tool operator; and means on said tool transfer mechanism for retaining the relative angular position of said tools during the transfer operation so that said keys and keyways will be properly positioned relative to each other to move into meshing engagement with each other when the tool is inserted into a carrier by said tool transfer mechanism.

* * * * *

UNITED STATES PATENT OFFICE
CERTIFICATE OF CORRECTION

Patent No. 3,760,489          Dated September 25, 1973

Inventor(s) Edward G. Griffith

It is certified that error appears in the above-identified patent and that said Letters Patent are hereby corrected as shown below:

Column 10, lines 7 and 8, delete the following sentence: "A like forward signal is transmitted by conduit 224 to solenoid valve 212."

Column 10, Claim 1, line 9, after "tools" insert -- ; --.

Column 10, line 9, "positioning means associated with each of said tool carriers;" should be inserted as a separate element and should be shown as line 10.

Signed and sealed this 19th day of March 1974.

(SEAL)
Attest:

EDWARD M. FLETCHER, JR.      C. MARSHALL DANN
Attesting Officer              Commissioner of Patents